United States Patent [19]
Thomsen

[11] Patent Number: 5,168,128
[45] Date of Patent: Dec. 1, 1992

[54] ANTI-TANGLE SPACED STIFFENERS FOR ELONGATED FLEXIBLE MEMBERS

[76] Inventor: Alan R. Thomsen, 3807 Oak St., Brooklyn Center, Minn. 55429

[21] Appl. No.: 691,338

[22] Filed: Apr. 25, 1991

[51] Int. Cl.$^5$ .............................................. H01B 7/00
[52] U.S. Cl. ................... 174/135; 174/136; 439/447; 439/501
[58] Field of Search ................ 174/135, 136; 439/501, 439/445, 447

[56] References Cited

U.S. PATENT DOCUMENTS

| | | | |
|---|---|---|---|
| 2,252,553 | 8/1941 | Campbell | 439/447 |
| 2,795,641 | 6/1957 | Rowell | 174/135 |
| 2,955,149 | 10/1960 | Gubernick | 174/135 |
| 4,018,983 | 4/1977 | Pedlow | 174/135 |
| 4,723,822 | 2/1988 | Merdic | 439/502 |

FOREIGN PATENT DOCUMENTS 447471  5/1936  United Kingdom ................ 174/135

OTHER PUBLICATIONS

Koide, V. et al; Countermeasure for Preventing the Spread of Fire through Electrical Cable Route (1)-applications of Intumescent Tube and Sheet to Grouped Cable on Site-; Dalnichi-Nippos Cables Rev (Japan); No. 65; Sep. 1979; pp. 12-18.

*Primary Examiner*—Morris H. Nimmo
*Attorney, Agent, or Firm*—Haugen and Nikolai, P.A.

[57] ABSTRACT

A configuration for elongated flexible members having stiffened portions alternated with flexible portions for preventing tangling of such elongated flexible members to permit folding of the elongated flexible member into compact storage relationship without tangling.

9 Claims, 3 Drawing Sheets

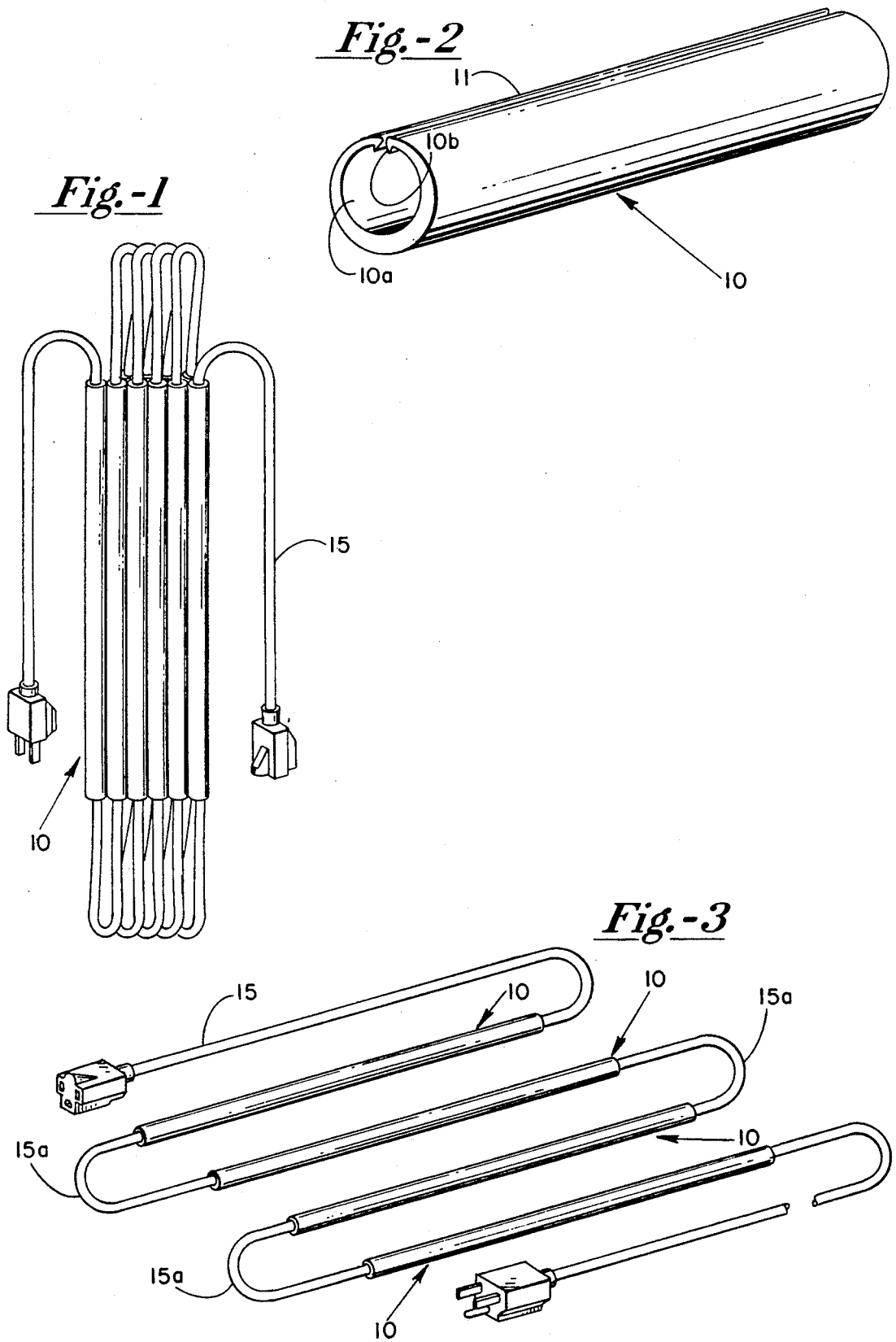

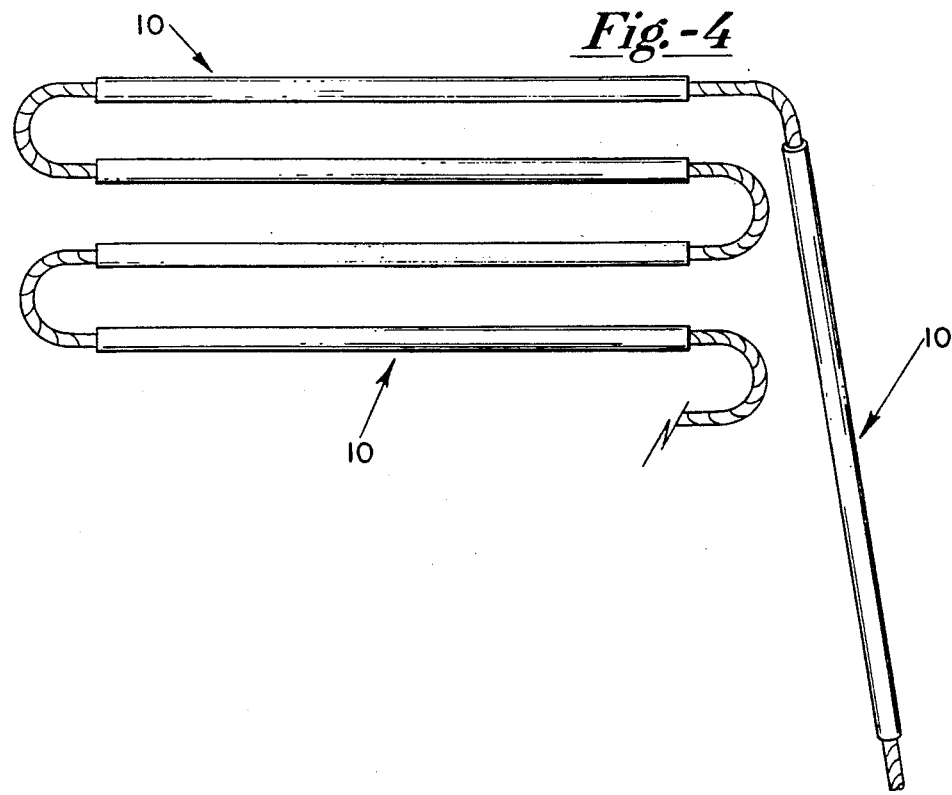
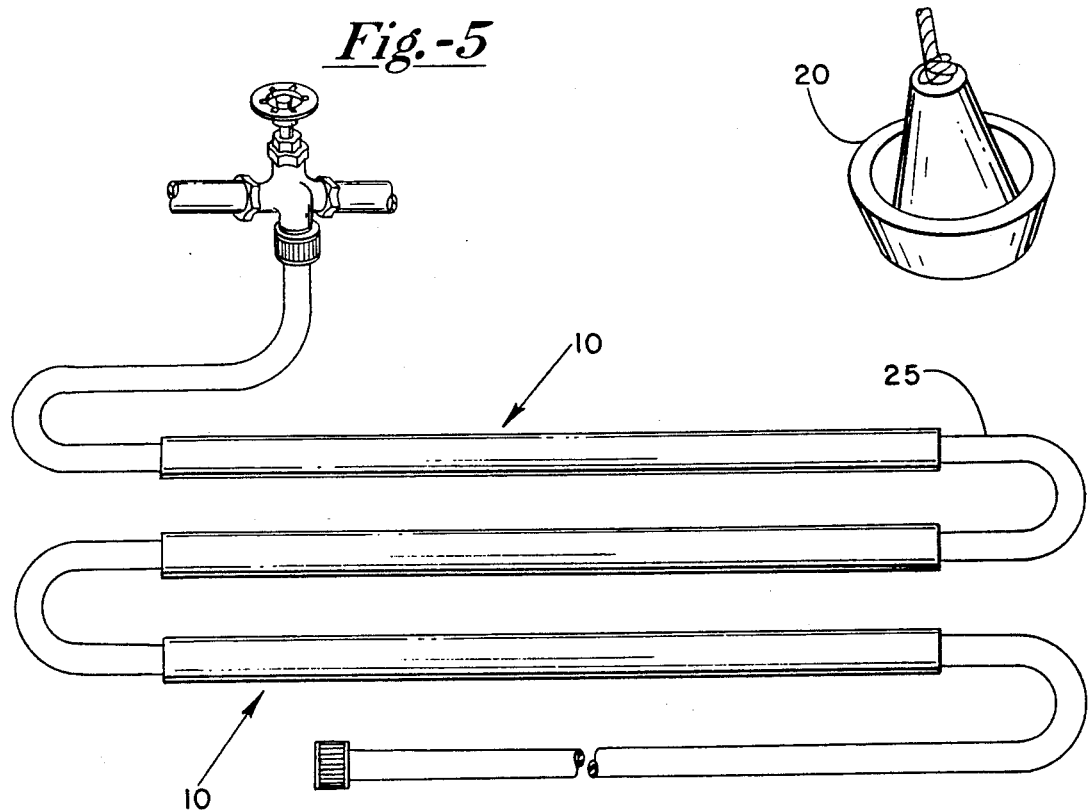

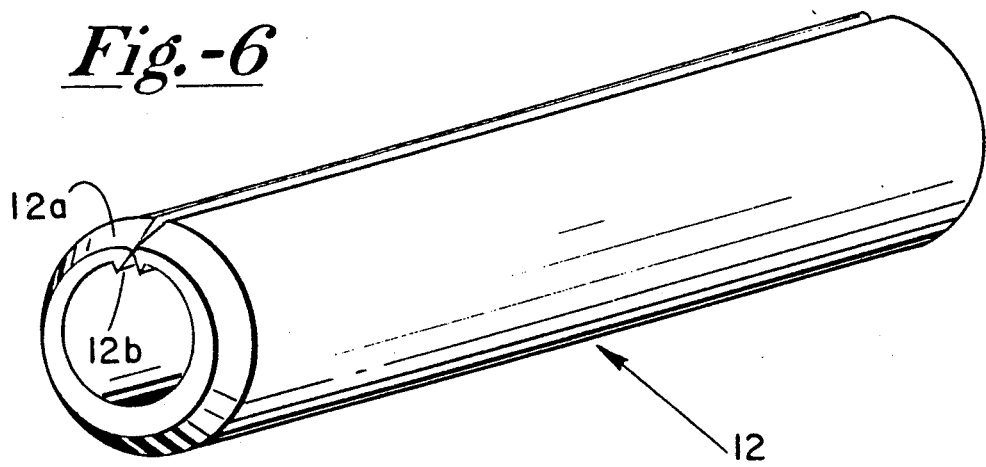

ANTI-TANGLE SPACED STIFFENERS FOR ELONGATED FLEXIBLE MEMBERS

BACKGROUND OF THE INVENTION

It has been a long existing problem to prevent tangling of elongated flexible members such as electric cords, ropes, air and water hoses, and medical tubing when packaging and storing the same. Such flexible members are difficult if not impossible to coil for storage in a form that will permit the uncoiling of the member for use without the inconvenience of tangles occurring.

PRIOR ART

The most pertinent prior art patents known to applicant at the time of filing this application are listed as follows:

| | |
|---|---|
| E. C. Cornell, Jr. | 3,056,102 |
| R. H. Ballock, Sr. | 3,520,988 |
| Narozay et al. | 3,997,229 |
| Merdle | 4,723,822 |

The above listed prior art patents are the only pertinent prior art known to applicant at the time of filing this application and do not in any way suggest a solution to the tangling problem solved by applicant's present invention.

SUMMARY OF THE INVENTION

The anti-tangle concept of this invention includes the use of a plurality of stiffened portions provided in spaced apart relation along the length of an elongated flexible member such as an electrical cord, water or air hose, or the like.

The stiffener portions are spaced apart a sufficient distance to permit the stiffened increments of length to be doubled back upon themselves and provide a tangle free coiled unit which can be compactly stored and which may be quickly and easily uncoiled either partially or entirely as desired. The invention makes the provision of a frame or reel on which the flexible member might be wound unnecessary.

DESCRIPTION OF THE DRAWINGS

FIG. 1 is a elevational view showing an embodiment of the invention applied to an electrical cord with the cord folded for storage.

FIG. 2 is a perspective view of an embodiment of the invention.

FIG. 3 shows an electrical cord with the anti-tangle stiffened portions alternated with flexible portions.

FIG. 4 shows the anti-tangle stiffened/flexible sections applied to a marine rope such as an anchor or water ski tow rope.

FIG. 5 show the invention applied to a garden hose.

FIG. 6 shows a another form of the invention.

DETAILED DESCRIPTION OF THE INVENTION

As illustrated in the accompanying drawings, this invention is adapted for use with a number of different types of elongated flexible members. The invention is adapted to be applied to elongated flexible members after initial manufacture or may be embodied in such flexible members at the time of manufacture.

In the forms shown in FIGS. 1-5, the invention makes use of a plurality of spaced split sleeve members, each of which is relatively stiff or rigid to prevent bending when attached around a flexible member such as an electric cord (FIG. 3), an anchor rope (FIG. 4), or a garden hose (FIG. 5).

FIG. 1 illustrates a relatively stiff elongated sleeve member 10 having a generally cylindrical outer configuration but being longitudinally split to provide a longitudinal access opening 11 and permit insertion of the elongated flexible member. The material used can be conventional plastic material such as PVC or vinyl which will resist bending of the sleeve in a transverse direction, but which will permit expansion of the sleeve at the longitudinal joint opening 11 to permit insertion of a flexible member into the central open area 10a defined within the hollow sleeve member 10. The inside diameter of the sleeve is sufficiently small to frictionally engage the outer surface of the flexible member to maintain its longitudinal position on the flexible member after installation thereon.

The length of the sleeve can be varied according to the desired shape and size of a storage area and a plurality of sleeves will be applied to the elongated flexible member in axially spaced relation thereon to provide a bending length of the elongated member to which the sleeves are attached.

FIG. 3 shows an electric cord member 15 having a plurality of sleeves 10 applied thereto in spaced relation to provide the bending lengths 15a between adjacent sleeves.

FIG. 4 shows the sleeves 10 mounted on a rope such as may be used for a boat anchor 20, as illustrated, or such as might be used for a ski tow rope (not shown).

FIG. 5 shows the sleeves 10 connected to a garden hose 25. The basic sleeve construction is similar to that described in connection with the attachment to the electrical cord 15 shown in FIG. 3.

A slightly modified sleeve 12 is shown in FIG. 6 having beveled ends 12a formed thereon and can be applied to any of the flexible members identified previously herein. Suitable means for maintaining the longitudinal position of the anti-tangle sleeves 10 and 12 may be provided such as the inwardly extending teeth members 10b shown in FIG. 2 and 12a shown in FIG. 6.

The invention includes the formation of alternating rigid and flexible axial portions of elongated flexible members. The sleeves shown herein are for the purpose of illustrating devices which may be used to practice the invention. Implementation may also be accomplished at the time of manufacture of the flexible member such as by changing the durometer and other physical properties of the basic material or materials used to make such flexible member.

It will be seen that this invention provides an anti-tangle stiffened portion alternated with more flexible portions along the axial length of the elongated member for attachment to the outside of a flexible member such as described herein. It will be understood that the spaced stiffener portions can be embodied in the flexible member at the time of manufacture thereof.

What is claimed is:

1. A tangle free elongated structure comprising an elongated flexible member having a plurality of spaced apart fixed substantially rigid portions defined along the length of the member and defining a plurality of flexible portions therebetween to permit bending the flexible member at the flexible portions for compact storage.

2. The structure set forth in claim 1 wherein the spaced rigid portions each constitute a hollow sleeve member surrounding a selected portion of the flexible member.

3. The structure set forth in claim 2 wherein each sleeve member is longitudinally split throughout its length to permit a selected section of a flexible member to be attached to the hollow sleeve member.

4. The structure set forth in claim 3 and means for maintaining the longitudinal position of each sleeve on said flexible member.

5. The structure set forth in claim 3 wherein the ends of the hollow sleeve members are beveled.

6. The structure as specified in claim 1 wherein the rigid portions have a length longer than a length of the flexible portions.

7. The structure as specified in claim 1 wherein the rigid portions are integral to the flexible member.

8. The structure as specified in claim 7 wherein the rigid portions have a greater durometer than a durometer of the flexible portions.

9. The structure as specified in claim 1 wherein the rigid portions are embodied in the flexible member.

* * * * *